United States Patent [19]

Pauly et al.

[11] Patent Number: 4,563,431
[45] Date of Patent: Jan. 7, 1986

[54] BIOLOGICALLY ACTIVE LATEX CONJUGATE

[75] Inventors: Hans-Erwin Pauly, Dautphetal; Wolfgang Kapmeyer, Marburg; Ulrich Seitz, Leonberg, all of Fed. Rep. of Germany

[73] Assignee: Hoechst Aktiengesellschaft, Frankfurt am Main, Fed. Rep. of Germany

[21] Appl. No.: 593,301

[22] Filed: Mar. 26, 1984

Related U.S. Application Data

[62] Division of Ser. No. 440,986, Nov. 12, 1982, Pat. No. 4,448,908.

[30] Foreign Application Priority Data

Nov. 13, 1981 [DE] Fed. Rep. of Germany ....... 3145082

[51] Int. Cl.$^4$ ............................................. G01N 33/54
[52] U.S. Cl. .................................... 436/533; 436/517; 436/534; 436/805; 523/201; 524/457; 524/458; 524/459; 524/460; 524/461; 525/296; 525/304; 525/902; 525/326.1; 525/328.2; 525/374

[58] Field of Search ................. 523/201; 524/457, 458, 524/459, 460, 461; 525/304, 902, 296, 328.2, 374; 436/533, 517, 534, 805

[56] References Cited

U.S. PATENT DOCUMENTS 4,210,723 7/1980 Dorman et al. ..................... 436/534
4,448,908 5/1984 Pauly et al. ......................... 523/201

OTHER PUBLICATIONS

Richard Juvet et al., J. Am. Chem. Soc., vol. 83, pp. 1560–1569, (1961), "Thermodynamics and Kinetics of the Alcoholysis of Acetals".

*Primary Examiner*—Joseph L. Schofer
*Assistant Examiner*—J. M. Reddick
*Attorney, Agent, or Firm*—Curtis, Morris & Safford

[57] ABSTRACT

A biologically active latex conjugate prepared by the acidification of latex particles of a core/shell polymer having acetal groups in the shell, whereby said acetal groups are converted to aldehyde groups, and then bonding a biologically active substance having an amino group to said aldehyde groups by reductive amination.

7 Claims, No Drawings

BIOLOGICALLY ACTIVE LATEX CONJUGATE

This is a division of application Ser. No. 440,986, filed Nov. 12, 1982, now U.S. Pat. No. 4,448,908.

The invention relates to a process for the preparation of a latex and of biologically active latex conjugates by the covalent coupling of low molecular weight or high molecular weight biologically active substances having free amino groups to reactive groups, derived from an aldehyde functional group, on the surface of latex particles. These biologically active latex conjugates are particularly suitable for serological or immunological assay procedures.

Increasing the sensitivity of assay procedures of these types by using indicator or support particles which are loaded with the appropriate immunological reagent, is known. Apart from biological support material, such as red blood cells or cells from a cell culture, primarily latex particles having a diameter of 0.03–5 μm are used. In spite of its wide use, the latex test procedure has hitherto had the particular disadvantages that loaded latex particles react non-specifically with one another and that the immunological reagents lose their biological activity on contact with the surface of the latex particles or that they can be desorbed from the particles.

It has emerged that chemical bonding of the immunological reagent to the support is superior to the physical surface adsorption hitherto used.

To date, processes have been used for linking the support and the immunologically active material which require a bifunctional coupling agent which links reactive groups of the protein with those of the support particles. The disadvantage of this method is that an undesired crosslinking of the immunologically active materials employed can occur as a side reaction, and the latter are thereby inactivated or are no longer available for coupling with the support.

Furthermore, processes are known in which the linking is carried out by means of surface epoxide groups or diazotizable aromatic amino compounds which are introduced during polymerization. In general, these processes have the disadvantage that these reactive groups of the latex can react with numerous functional grouups of immunologically active materials. Thus undesired bonds can be formed, which destroy the reactivity of the immunologically active material by steric effects or by conformational changes. A further disadvantage is due to the fact that these groups, which are capable of bonding, are labile (epoxides, for example, are decomposed by hydrolysis), so that active latex particles of this type cannot be stored for very long.

Thus there was a need for a support which is simple to prepare and can be linked, under mild conditions, even with sensitive immunologically active materials to give a reagent which can be used for diagnosis. The reactivity of the bonded material should be retained for a long time. The reagent should react specifically and sensitively.

It has now been found, surprisingly, that supports suitable for the purpose methods are obtained when preformed latex cores in an aqueous medium are swelled with vinyl monomers which contain acetal functionalities bonded via amide groups, and these vinyl monomers, which must be sufficiently insoluble in water, are copolymerized with other monomers which can be of a hydrophilic or an ionic nature. Both oil-soluble and also water-soluble radical procedures can be used as initiators of the radical chain polymerization. Particularly useful hydrophilic comonomers are methacrylic or acrylic acid or methacrylamide or acrylamide derivatives.

The fact that hydrophilic monomers can be used is of particular importance for the stability of the bonded immunologically active materials, since sensitive proteins, for example, can have their conformation changed by hydrophobic surfaces and be inactivated. In addition, particles having hydrophilic surfaces are preferable because they take part in fewer non-specific interactions with one another. These are a significant cause of false test results.

The invention furthermore relates to a process for the preparation of biologically active latex conjugates in which amino groups of the substances to be bonded are linked with aldehyde groups on the surface of the latex particles by the principle of reductive amination. These aldehyde groups can be produced from acetal groups by brief acidification. This has the advantage that latex particles carrying aldehyde groups can be stored without loading in the form of the stable acetals and can be converted into a form having bonding activity without a coupling agent. Furthermore, the reductive amination makes it possible to bond biologically active substances under very mild conditions, since only their amino groups are selectively bonded, and these are available, for example, in proteins in large number and they retain their natural shaped form in this method of linking. In comparison to other methods, this method is also particularly mild, since the chemical bond is formed rapidly and at a physiological pH.

Thus the invention relates to a novel latex which is coated with a surface layer of a copolymer in which groups having terminal acetals of the formula I are contained:

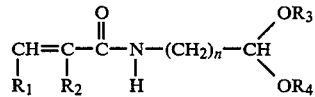

wherein
n denotes 1–6;
$R_1$ denotes H;
$R_2$ denotes H or $CH_3$; and
$R_3$ and $R_4$ denote $C_2$–$C_6$-alkyl, aryl or another group which ensures that the compounds of the formula I have sufficient insolubility in water.

Latices of this type can be prepared by graft copolymerization on customary and conventional latex particles, which can be obtained by known processes as homopolymers or copolymers of monomers, as are described, for example, in German Offenlegungsschrift No. 2,907,794.

Preferred monomers for the graft copolymerization to prepare the surface layer on the latex particles are mixtures of one or more monomers used for producing the cores and other copolymerizable ethylenic unsaturated compounds having terminal acetal groups. These can be derivatives of methacrylic acid of the formula I, but other monomers containing acetal groups also appear to be suitable, provided they are sufficiently insoluble in water, since otherwise polymerization in the aqueous phase would take place instead of grafting onto the polystyrene latex.

Hydrophilic monomers can be used as further additives (for example hydroxyethylacrylamide and other monomers containing hydroxyl groups). It is particularly advantageous to use small amounts of ionic comonomers, such as, for example, acrylic acid, methacrylic acid or acrylamidopropanesulfonic acid, as anionic monomers or 4-vinylpyridine or methacrylamidopropyltrimethylammonium chloride as cationic monomers. These contribute considerably to the stabilization of the latex.

The graft layer can be specifically adapted to the conditions for optimal bonding and stability of the immunologically active material employed in each case by merely changing the mixing ratio of the monomers to be grafted on.

It is of great importance for building up the graft layer and the durability of the support-reagent bond that the polymerizing vinyl group is linked with the particular functional end of the molecule via an amide bond. It is true that grafting of the type described can also be carried out with monomers which contain ester bonds instead of amide bonds, for example ethyl (meth-)acrylate di-n-pentyl acetal or hydroxyethyl (meth)acrylate. However, the ester group can be considerably more easily cleaved hydrolytically at all pH values below or above pH 7, as can occur during activation, coupling or storage of the latices, then a corresponding acrylamide or methacrylamide derivative.

In general, to prepare the polystyrene latex modified according to the invention, about 40-70% of that amount of an emulsifier which would be necessary for maximum coverage of its surface is added to a preformed polystyrene latex of arbitrary particle diameter, then the mixture of graft monomers is added and the latex is swelled and polymerized.

For the preparation of a latex conjugate according to the invention, a suspension of the graft polymerized latex particles described above is adjusted to a pH below 2 by the addition of acid, incubated and, after neutralization, incubated with the immunologically active material to be bonded, in the presence of a suitable reducing agent. A solution of sodium cyanoborohydride in a neutral buffer is preferably employed for the reduction.

After the bonding reaction, it can be advantageous to "seat in" excess aldehyde groups by the addition of a compound having free amino groups, preferably in a buffer.

The removal of any non-bonded immunologically active material or other impurities from the reaction mixture by centrifugation or washing on suitable membranes is advisable for some uses.

The latex conjugates can be employed in various diagnostic procedures, for example in qualitative and semi-quantitative assays of substances using latex agglutination tests, for example on glass supports, for assay of trace proteins by nephelometry or turbidimetry in a direct or competitive agglutination test or in the latex-hapten inhibition test.

EXAMPLE 1

Preparation of methacrylamidoacetaldehyde di-n-pentyl acetal (1)

Aminoacetaldehyde d-n-pentyl acetal was prepared by transacetalization of aminoacetaldehyde dimethyl acetal with pentanol following the general procedure of Juret and Chin in J. Am. Chem. Soc. 83, 1560 (1961).

The monomer (1) was prepared by reaction of methacryloyl chloride and aminoacetaldehyde di-n-pentyl acetal in anhydrous solution.

For this purpose, 7.2 g of aminoacetaldehyde di-n-pentyl acetal ($3.3 \times 10^{-2}$ mole) and 9.1 g of $K_2CO_3$ ($6.6 \times 10^{-2}$ mole) were initially introduced into 20 ml of anhydrous chloroform under nitrogen and cooled down to 0° C. To this were added dropwise, while stirring, within 30 minutes, 3.4 g of methacryloyl chloride ($3.3 \times 10^{-2}$ mole) dissolved in 20 ml of chloroform. After a total of 90 minutes, the mixture was allowed to warm slowly to room temperature.

Water was added to the reaction mixture, the chloroform phase was separated off, dried and the solvent was removed from the product (1) in vacuo at room temperature. The product was 6.0 g of yellowish viscous oil (yield 64%), which cannot be distilled, since it rapidly polymerizes at an elevated temperature.

EXAMPLE 2

(a) Graft copolymerization of (1) on polystyrene latices using a water-soluble radical producer 45 ml of a detergent-free polystyrene latex (corresponding to 4 g of solid material) having a mean particle diameter of 196 nm were introduced together with 0.0486 g of sodium dodecyl sulfate, 33 ml of $H_2O$, 0.66 g of methacrylamidoacetaldehyde di-n-pentyl acetal, 0.33 g of methacrylic acid and 0.01 g of azobisisobutyronitrile into a reaction vessel. The mixture was carefully evacuated several times and flushed with nitrogen. This mixture was allowed to emulsify by stirring at room temperature for one hour and then polymerized at 70° C. for 5 hours.

The cooled latex was purified by ultrafiltration. The content of carboxyl groups (by potentiometric titration) was 0.23 mEq of COOH per g of polymer, the content of aldehyde groups (after acid cleavage of the acetals and titration with hydroxylamine) was 0.13 mEq of aldehyde per g of polymer.

(b) Graft copolymerization of (1) on polystyrene latices with a water-soluble radical producer 45 ml of a detergent-free polystyrene latex (corresponding to 4 g of solid material) having a mean particle diameter of 196 nm were introduced together with 0.0486 g of sodium dodecyl sulfate, 32 ml of $H_2O$, 0.4 g of methacrylamidoacetaldehyde di-n-pentyl acetal, 0.04 g of styrene and 0.2 g of methacrylic acid into a reaction vessel. The mixture was carefully evacuated several times and flushed with nitrogen. This mixture was allowed to emulsify at room temperature for 1 hour and was then heated to 70° C. and, after stirring for a further 15 minutes, copolymerization was started by injection of 0.016 g of potassium peroxodisulfate dissolved in 1 ml of water. The polymerization ran at 70° C. for 5 hours. The cooled latex was purified by ultrafiltration. The content of carboxyl groups was 0.1 mEq per g, the content of aldehyde groups was also 0.1 mEq per g and the new mean particle diameter was 207 nm.

EXAMPLE 3

Competitive laser nephelometric test to determine βSP1-glycoprotein (a) Preparation of the βSP1-latex conjugate To activate the latex, 3 ml of a 5% (w/v) latex suspension from Example 2b were incubated with 300 μl of 1N HCl and 300 μl of a 20% (w/v). Tween ®20 solution at room temperature for 1 hour. The pH was then adjusted to 6.5 by the addition of 250 μl of 1N NaOH and saturated disodium hydrogen phosphate solution. With this, 1.5 ml of a 1 mg/ml solution of βSP1-glycoprotein and 1 mg/ml of human serum albumin in physiological saline (PBS) and 1.5 ml of a 0.5% strength solution of sodium cyanoborohydride in phosphate-buffered saline were incubated at +4° C. overnight. In order to seal in the excess aldehyde groups, 1.2 ml of a 0.5 molar ethanolamine hydrochloride solution (pH 8.5) and 0.3 ml of a 2.5% (w/v) sodium borohydride solution were added and the batch was incubated at +4° C. for 1 hour. Subsequently, the βSP1-latex conjugate was centrifuged down and the precipitate was taken up in 3 ml of PBS containing 0.2% of Tween ®20. (b) Test procedure:

Serum samples were prediluted 1:5 in PBS containing 1.7% of Tween ®20. The standard employed was βSP1-glycoprotein (Behringwerke AG), diluted 1:5 in PBS containing 1.7% of Tween 20 and 20% human serum from male donors. For the measurement, 100 μl of the diluted sample or of the standard, 100 μl of rabbit antiserum against human βSP1-glycoprotein (diluted 1:3,200 in 0.1 molar glycine buffer pH 8.2 containing 1% of NaCl) and 200 μl of a latex reagent diluted 1:100 in PBS containing 1.7% of Tween ®20 were mixed in the cuvette.

The mixture was incubated at room temperature for 3 hours and then measured in a laser nephelometer (Behringwerke AG). The scattered light signals measured for the unknown samples were evaluated using a reference curve which had been constructed with the aid of standard dilutions. The range of measurement extended from about 2.5 μg/ml to 50 ng/ml of βSP1-glycoprotein.

EXAMPLE 4

Direct nephelometric assay of tetanus toxoid-specific antibodies

The preparation of tetanus toxoid-latex conjugates was carried out in analogy to Example 3, starting from 3 ml of a 5% (w/v) latex suspension and 1.5 ml of a tetanus toxoid solution with about 3,00 Lf/ml. 3 ml of a tetanus toxoid-latex conjugate were obtained in this manner. The standard employed was a human gammaglobulin pool (160 mg/ml) having about 20 IU/ml of tetanus toxoidspecific antibody activity (Beriglobin ®, Behringwerke AG) in dilutions of 1:80–1:5120 in 0.1 molar glycine buffer pH 8.2 containing 1% of sodium chloride.

Before measurement, patients' sera were diluted 1:100 or 1:20 in 0.1 molar glycine buffer pH 8.2 containing 1% of NaCl. For the test mixture, 100 μl of diluted sample or standard were mixed in the cuvette with 200 μl of the latex conjugate suspension diluted 1:25 in PBS containing 0.2% of Tween 20. After 2 hours, the scattered light signal was found in the laser photometer and the evaluation was undertaken using the reference curve constructed for the standard dilutions.

EXAMPLE 5

Determination of hapten by latex agglutination inhibition

The preparation of epsilon-dinitrophenyl-L-lysine-latex conjugates was carried out in analogy to Example 3, starting from 3 ml of a 5% (w/v) latex suspension and 1.5 ml of a 0.66% (w/v) solution of epsilon-dinitrophenyl-L-lysine (DNP-Lys) supplied by SERVA, Heidelberg. After blocking the excess aldehyde groups, the haptenlatex conjugate (DNP-latex) was centrifuged down, resuspended in 1 ml of PBS containing 0.2% of Tween ®20 and after again centrifuging down, taken up in 3 ml of PBS containing 0.2% of Tween ®20.

The DNP-latex suspension was mixed with antisera against the dinitrophenyl radical obtained from goats (supplied by Paesel, Frankfurt) on the reaction compartments of latex test plates of Behringwerke AG and produced, at suitable dilution, agglutination and it was possible to assess visually its intensity of reaction by the customary criteria as 40+. As shown in Table 1, the agglutination reaction can be inhibited by addition of the hapten (DNP). This can be used to determine the hapten in a sample fluid.

TABLE 1

| Concentration of DNP-Lys in the sample fluid added (PBS) in μg/ml | | | | | |
|---|---|---|---|---|---|
| | 0 | 0.5 | 1 | 2 | 10 |
| Intensity of reaction of agglutination | 4+ | 2-3+ | 1-2+ | 0 | 0 |

We claim:
1. A method for making a biologically active latex conjugate which method comprises:
   (1) acidifying latex particles comprising a core of a polymer of at least one ethylenically unsaturated monomer and a shell, graft polymerized to said core, of a copolymer comprising at least one ethylenically unsaturated monomer and an acetal monomer of the formula

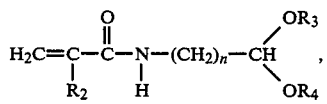

whereby acetal groups present in said shell are converted to aldehyde groups, and wherein, in said formula, n is 1 to 6, $R_2$ is H or $CH_3$, and $R_3$ and $R_4$ are alkyl having 2 to 6 carbon atoms, aryl, or some other inert group imparting sufficient water insolubility to said monomer to permit graft polymerization thereof to said core polymer in an aqueous latex of core polymer particles,
   (2) bonding a biologically active substance having an amino group to the surface of said latex particles by reductive amination of said aldehyde groups.
2. A biologically active latex conjugate made by the method of claim 1.
3. A latex conjugate as in claim 2 wherein $R_3$ and $R_4$ are alkyl having 2 to 6 carbon atoms or are aryl.
4. A latex conjugate as in claim 2 wherein said core polymer is polystyrene.
5. A latex conjugate as in claim 2 wherein said acetal monomer is methacrylamidoacetaldehyde di-n-pentyl acetal.
6. A latex conjugate as in claim 4 wherein said shell is a copolymer of methacrylamidoacetaldhyde di-n-pentyl acetal, methacrylic acid, and styrene.
7. A latex conjugate as in claim 2 wherein said biologically active substance is an immunologically active substance.

* * * * *

UNITED STATES PATENT AND TRADEMARK OFFICE
CERTIFICATE OF CORRECTION

PATENT NO. : 4,563,431

DATED : January 7, 1986

INVENTOR(S) : Pauly et al.

It is certified that error appears in the above-identified patent and that said Letters Patent is hereby corrected as shown below:

In heading [73] assignee, change "Hoechst Aktiengesellschaft, Frankfurt am Main, Federal Republic of Germany" to --Behringwerke Aktiengesellschaft, Marburg, Federal Republic of Germany--.

Signed and Sealed this

Twenty-sixth Day of August 1986

[SEAL]

*Attest:*

DONALD J. QUIGG

*Attesting Officer*  *Commissioner of Patents and Trademarks*